(12) United States Patent
Nakazawa

(10) Patent No.: US 6,353,509 B1
(45) Date of Patent: Mar. 5, 2002

(54) WIDE-ANGLE LENS

(75) Inventor: Kimiaki Nakazawa, Saitama (JP)

(73) Assignee: Fuji Photo Optical Co., Ltd., Omiya City (JP)

( * ) Notice: Subject to any disclaimer, the term of this patent is extended or adjusted under 35 U.S.C. 154(b) by 30 days.

(21) Appl. No.: 09/644,555

(22) Filed: Aug. 24, 2000

(30) Foreign Application Priority Data

Sep. 9, 1999 (JP) ............................................ 11-255859

(51) Int. Cl.$^7$ ................................................. G02B 9/62
(52) U.S. Cl. ...................................... 359/761; 359/756
(58) Field of Search ................................. 359/761, 756, 359/763, 770, 771, 781, 784, 788, 752, 753

(56) References Cited

U.S. PATENT DOCUMENTS

| | | | | |
|---|---|---|---|---|
| 3,963,325 A | * | 6/1976 | Takahashi | ................ 359/752 |
| 4,206,975 A | | 6/1980 | Maeda | .................... 359/761 |
| 5,255,121 A | | 10/1993 | Suzuki | ..................... 359/643 |
| 5,963,381 A | * | 10/1999 | Ori | ............................. 359/763 |
| 6,075,658 A | * | 6/2000 | Nagahara | ................ 359/753 |

FOREIGN PATENT DOCUMENTS

JP          2001133685 A   *  5/2001   ............ G02B/13/04

* cited by examiner

Primary Examiner—Georgia Epps
Assistant Examiner—David N. Spector
(74) Attorney, Agent, or Firm—Arnold International; Bruce Y. Arnold

(57) ABSTRACT

A wide-angle lens is disclosed having only three lens groups of negative, positive, and positive refractive power, in order from the object side, and having only six lens elements with refractive power. The first lens group is formed of a meniscus lens with its convex surface on the object side, the second lens group is formed of a biconvex lens, and the third lens group is formed of, in order from the object side, a biconcave lens element, a positive lens element having a convex surface on the image side, a positive lens element having a convex surface on the image side, and a positive lens element having a convex surface on the object side. A diaphragm is arranged between the second lens group and the third lens group. Furthermore, specified conditions are satisfied in order to provide a compact wide-angle lens that is well corrected for aberrations and has a sufficient back focal length to insert additional optical components.

11 Claims, 4 Drawing Sheets

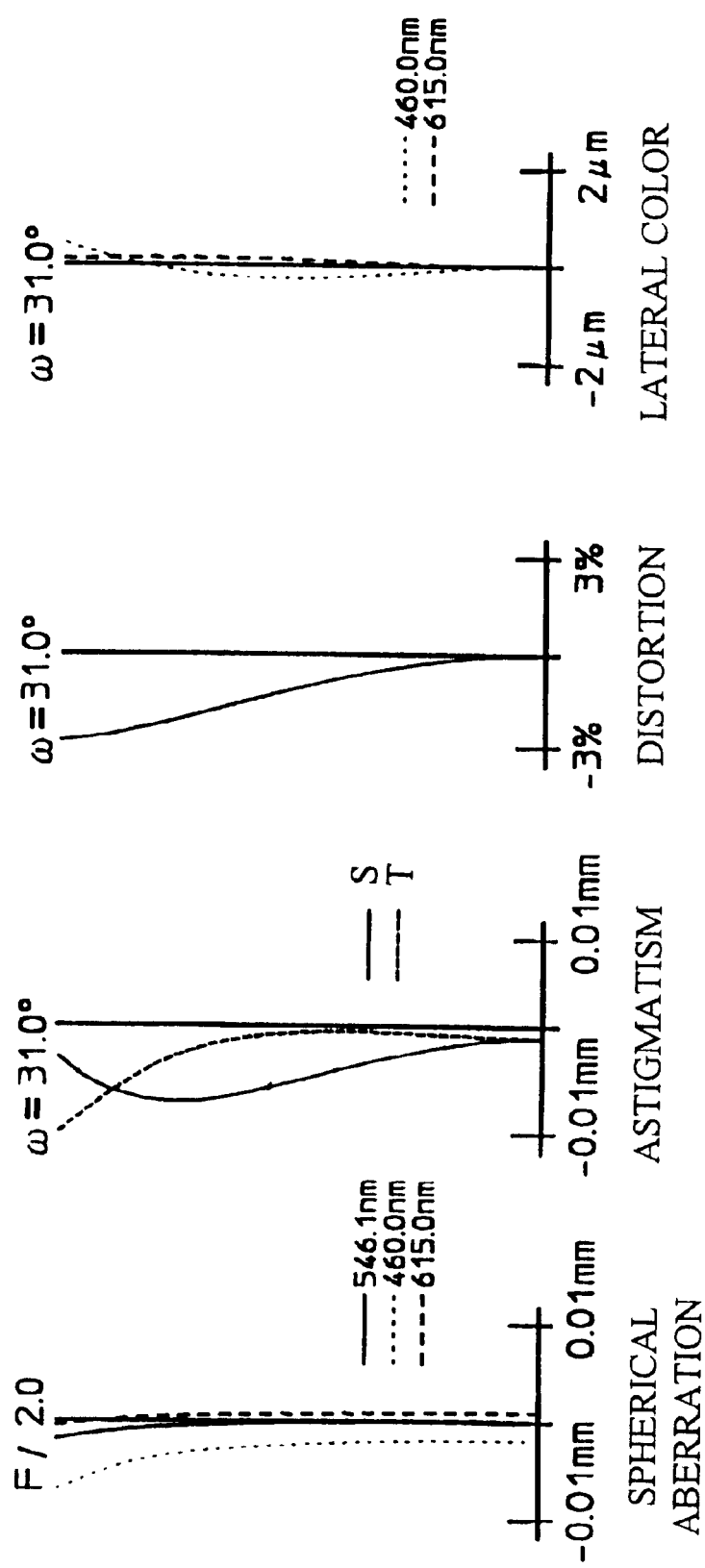

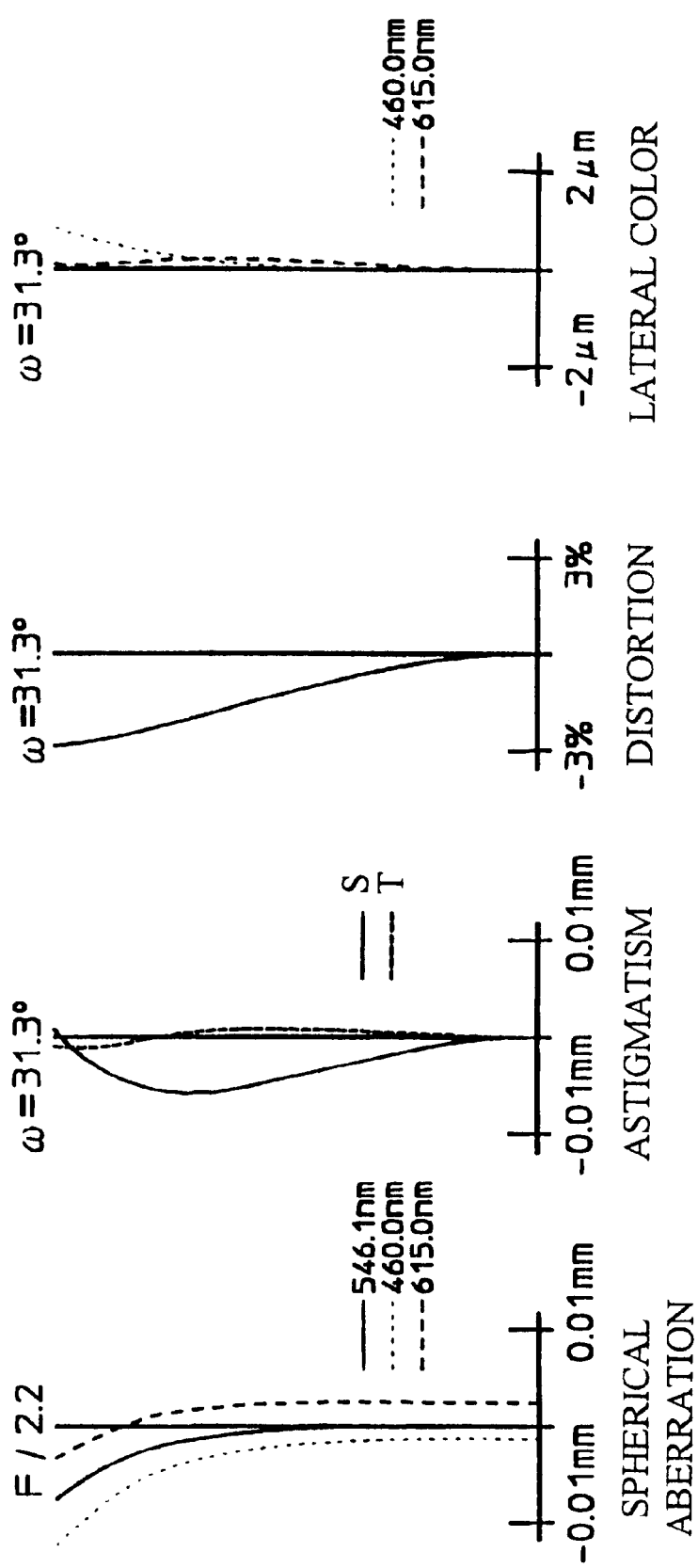

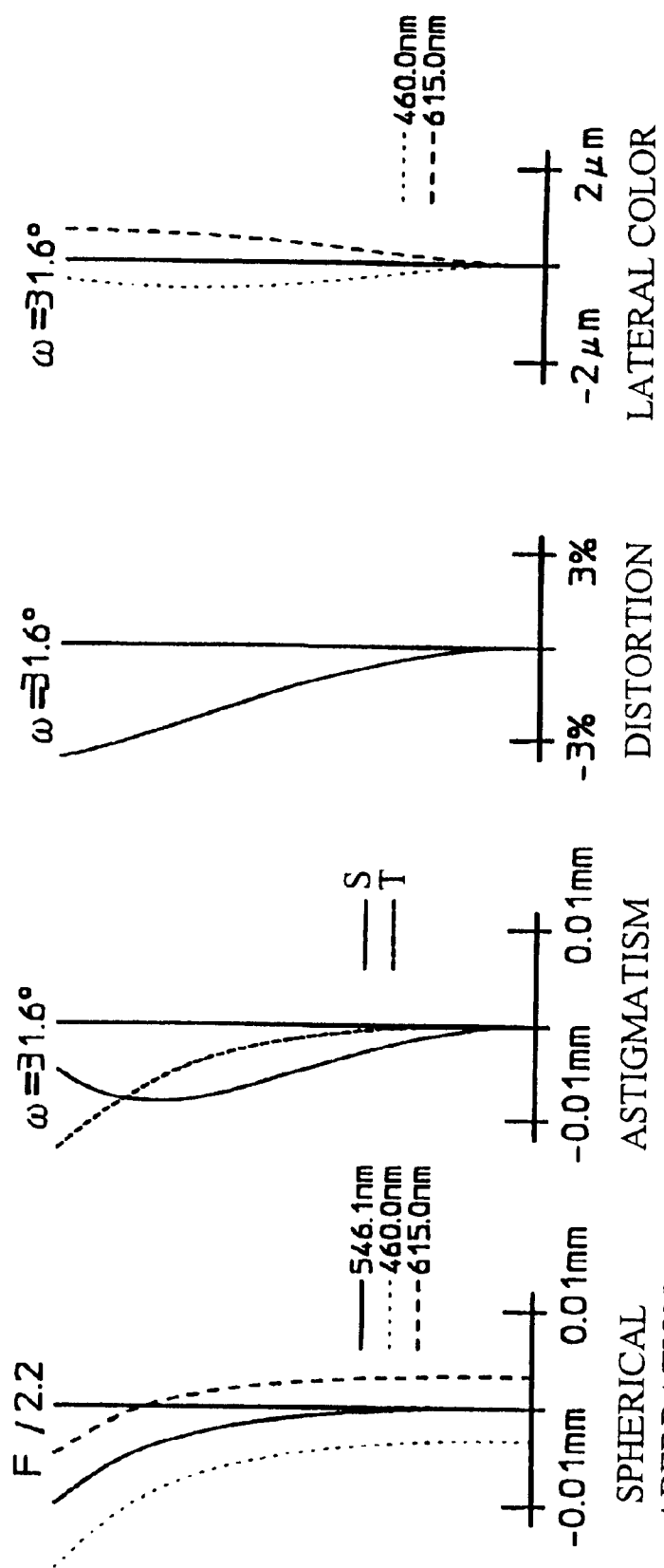

WIDE-ANGLE LENS

BACKGROUND OF THE INVENTION

With the increasing use of personal computers in households in recent years, electronic still cameras capable of photographing an object and recording the image as digital files into personal computers are becoming increasingly popular. Recently, electronic still cameras having a CCD detector array with 2 million pixels or more (i.e., the UXGA standard) has made its appearance. These CCD detector arrays not only have a smaller single pixel size than those of conventional CCD detector arrays; in addition, the array size is also larger in area. Furthermore, the photographic lens of an electronic still camera in which is mounted a CCD having a high number of pixels is required to have a high-resolution because the size of a single pixel is very small. In order to maintain a minimum amount of received light for each pixel, a higher brightness is required than would be needed if the pixel size were larger. Further, as the array size of a CCD array becomes larger, a wider angle imaging lens is required in order to keep the overall length of the imaging lens short.

As with conventional photographic lenses used with electronic still cameras, lens systems which have a wide angle and yet have a comparatively simple construction with only a small number of lens elements usually have a large $F_{NO}$, and it is difficult to satisfy the need for a high degree of resolution.

On the one hand, with electronic still cameras, in order to improve the light receiving sensitivity of photographic pixels attached to micro-lenses, a retro-focus type lens may be used for the image-forming lens. In addition to providing a lens with a long focal length, the back-focus length of this type of lens can be made long.

However, if use is made of this type of retro-focus type lens as the image-forming lens, distortion is easily produced by the negative power of the previous lens group. In addition, when a subject to be photographed is positioned at a very close distance, curvature of the image surface occurs easily. Given a construction wherein the optical flux is transmitted by a more forward lens group, and converged by a more rearward lens group, astigmatism and/or lateral color easily become too large, and it becomes difficult to correct these aberrations.

BRIEF SUMMARY OF THE INVENTION

The present invention relates to a wide-angle lens and, in particular, to a video camera or an electronic still camera which forms an object image onto a fixed photographic element. The object of the present invention is to provide a wide-angle lens having a large back focal length that favorably corrects aberrations so as to obtain an image of high quality.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion, and lateral color respectively, of the wide-angle lens of Embodiment 1, FIGS. 3A–3D show the spherical aberration, astigmatism, distortion, and lateral color respectively, of the wide-angle lens of Embodiment 2 and FIGS. 4A–4D show the spherical aberration, astigmatism, distortion, and lateral color respectively, of the wide-angle lens of Embodiment 3.

DETAILED DESCRIPTION

Figure 1:
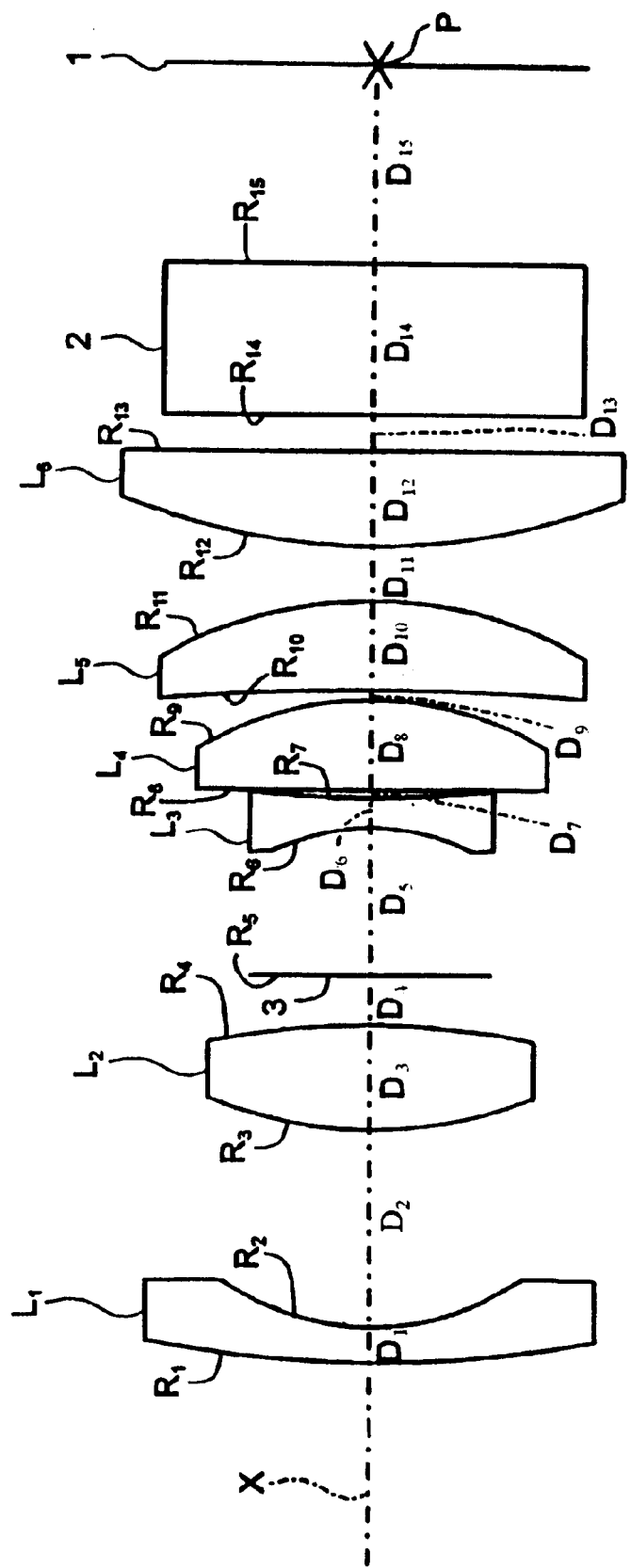
FIG. 1 shows the basic lens element configuration of the wide-angle lens of Embodiment 1, and is also fairly representative of the basic lens element configuration of the wide-angle lens of Embodiments 2 and 3.

The wide-angle lens of the present invention is formed of three lens groups having, in order from the object side, negative, positive and positive refractive power. A diaphragm is arranged between the second lens group and the third lens group. The first lens group is formed of a negative meniscus lens element with its convex surface on the object side. The second lens group is formed of a biconvex lens. The third lens group is formed of, in order from the object side, a biconcave third lens element, a positive fourth lens element having a convex surface on the image side, a positive fifth lens element having a convex surface on the image side, and a positive sixth lens element having a convex surface on the object side. Furthermore, the following Conditions (1) to (7) are satisfied.

| | |
|---|---|
| $0.8 < B_f/f < 1.1$ | Condition (1) |
| $1.1 < f_{1-2G}/f < 1.5$ | Condition (2) |
| $1.4 < f_{3G}/f < 2.1$ | Condition (3) |
| $3.0 < f_6/f < 4.5$ | Condition (4) |
| $N_2 > 1.72$ | Condition (5) |
| $N_3 > 1.77$ | Condition (6) |
| $\nu_{d3} < 30$ | Condition (7) | where $B_f$ is the back focus of the whole system when focused on an object at infinity (i.e., the distance from the image side of the sixth lens element surface to the on-axis position of the image surface, for an object at infinity), f is the focal length of the whole system, $f_{1-2G}$ is the composite focal length of the first lens group and the second lens group, in order from the object side, $f_{3G}$ is the focal length of the third lens group, in order from the object side, $f_6$ is the focal length of the sixth lens element $L_6$, in order from the object side, $N_2$ is the index of refraction (at the sodium d line) of the second lens element $L_2$, $N_3$ is the index of refraction (at the sodium d line) of the third lens element $L_3$, and $\nu_{d3}$ is the Abbe number (for the sodium d line) of the third lens element $L_3$.

Further, preferably, Condition (8) below is satisfied:

$$0.15 < d_{5-6}/f < 0.35 \quad \text{Condition (8)}$$

where $d_{5-6}$ is the on-axis spacing between the fifth and sixth lens elements when the wide-angle lens is focused on an object at infinity, and f is as defined above.

It is also preferred that, at the time of performing focus adjustment, only the sixth lens element, in order from the object side, is moved along the optical axis. This lens element should be plastic so that it is lightweight and so that its surface can be made aspherical at low cost.

An explanation is provided hereinafter of the purpose of Condition (1)–(8).

Condition (1) regulates the range of acceptable values of the back focus relative to the focal length of the wide-angle lens. If the lower limit is not satisfied, the working space for inserting a low pass filter and the like immediately in front of the CCD cannot be assured. If the upper limit of Condition (1) is not satisfied, the wide-angle lens body becomes too long.

Condition (2) regulates the combined focal length of the lens elements on the object side of the diaphragm relative to the focal length of the wide-angle lens. If the lower limit is not satisfied, correction of distortion becomes difficult and it becomes difficult to assure an adequate back focus $B_f$. On the other hand, if the upper limit is not satisfied, the power of the third lens group becomes too strong in comparison with that of the combined powers of the first and second lens groups so that correction of spherical aberration becomes difficult.

Condition (3) regulates the focal length of the third lens group (i.e., of the lens elements on the image side of the diaphragm) relative to the focal length of the wide-angle lens. If the lower limit is not satisfied, there may be insufficient back focus $B_f$ for inserting additional components, and the distortion becomes greater. On the other hand, if the upper limit is not satisfied, the power of the third lens group becomes too weak, making the overall length of the wide-angle lens such that compactness is lost.

Condition (4) regulates the focal length of the lens element that is used for focus adjustments (i.e., the sixth lens element), relative to the focal length of the wide-angle lens. If the lower limit is not satisfied, aberrations are made larger. On the other hand, if the upper limit is not satisfied, the amount of movement required of the focusing lens element becomes larger; thus, the spacing between the fifth lens element and the sixth lens element must be greater, thereby increasing the overall size of the wide-angle lens.

Condition (5) specifies that the index of refraction of the second lens element be greater than 1.72, and Condition (6) specifies that the index of refractive of the third lens element be greater than 1.77. If Conditions (5) and (6) are not satisfied, the overall size of the lens system must increase.

Condition (7) specifies the minimum Abbe constant for the third lens element $L_3$. If Condition (7) is not satisfied, it becomes difficult to correct for chromatic aberration.

Condition (8) assures that there is adequate space between the fifth and sixth lens elements for focusing, relative to the focal length of the wide-angle lens. If the lower limit is not satisfied, the space becomes insufficient. On the other hand, if the upper limit is not satisfied the wide-angle lens loses compactness.

Three embodiments of the invention will now be discussed in detail, with reference to the drawings. Although FIG. 1 shows the specific lens element configuration for Embodiment 1 only, it is also representative of the approximate lens element configuration for all three embodiments of the invention.

Embodiment 1

As shown in FIG. 1, the wide-angle lens of Embodiment 1 is constructed of three lens groups and six lens elements. In order from the object side, the first lens group has negative refractive power, the second lens group has positive refractive power, and the third lens group has positive refractive power. A diaphragm 3 is arranged between the second lens group and the third lens group. The first lens group is formed of a first lens element $L_1$ having a meniscus shape with its convex surface on the object side. The second lens group is formed of a second lens element $L_2$ that is biconvex. The third lens group is formed, in order from the object side, of a third lens element $L_3$ that is biconcave, a fourth lens element $L_4$ that is biconvex, a fifth lens element $L_5$ formed from a positive meniscus lens with its convex surface on the image side, and a sixth lens element $L_6$ formed as a plano-convex plastic lens with its convex surface on the object side.

A filter block 2, which may include a low pass filter or the like, may be arranged between the sixth lens element $L_6$ and the image-forming position P. Preferably, all of the above Conditions (1) to (8) are satisfied. Further, at the time of performing focal point adjustment, only the sixth lens element $L_6$ is moved along the optical axis.

Table 1 below lists the surface number #, in order from the object side, the radius of curvature R (in mm) of each lens element surface, the on-axis surface spacing D (in mm), as well as the index of refraction $N_d$ and the Abbe number $\nu_d$ (relative to the d line) for each lens element of Embodiment 1. The surface listed with a * to the right of the surface number # is an aspherical surface having a shape defined by Equation (A) below.

$$Z = CY^2/\{(1+(1-KC^2Y^2)^{1/2})\} + A_4Y^4 + A_6Y^6 + A_8Y^8 + A_{10}Y^{10} \quad \text{Equation A}$$

where

Z is the length (in mm) of a line drawn from a point on the aspherical surface at distance Y from the optical axis to the tangential plane of the aspherical surface vertex, C (=1R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

The values of the focal length f, the half-field angle 106), and the $F_{NO}$, as well as the constants K, $A_4$, $A_6$, $A_8$, and $A_{10}$ which define the aspherical surface according to Equation (A) above, are given in the middle portion of Table 1. In the lower portion of the table, the values of Conditions (1) to (8) are listed.

TABLE 1

| # | R | D | $N_d$ | $\nu_d$ |
|---|---|---|---|---|
| 1 | 3.2799 | 0.09750 | 1.77250 | 49.6 |
| 2 | 0.7230 | 0.55441 | | |
| 3 | 1.1692 | 0.29379 | 1.83481 | 42.7 |
| 4 | −2.3587 | 0.13928 | | |
| 5 | ∞ (stop) | 0.41785 | | |
| 6 | −0.6203 | 0.08357 | 1.84666 | 23.8 |

TABLE 1-continued

| | | | | |
|---|---|---|---|---|
| 7 | 3.0773 | 0.02152 | | |
| 8 | 38.5701 | 0.25215 | 1.77250 | 49.6 |
| 9 | −0.9432 | 0.02786 | | |
| 10 | −7.5568 | 0.25186 | 1.72916 | 54.7 |
| 11 | −1.1852 | 0.15757 | | |
| 12* | 1.6338 | 0.26926 | 1.49018 | 57.8 |
| 13 | ∞ | 0.10000 | | |
| 14 | ∞ | 0.41785 | 1.51633 | 64.2 |
| 15 | ∞ | 0.54632 | | |

$f = 1.0 \quad \omega = 31.0 \quad F_{NO} = 2.0$
Aspherical coefficients of surface #12:

| K | $A_4$ | $A_6$ | $A_8$ | $A_{10}$ |
|---|---|---|---|---|
| −1.5783681 | −0.6038269 × 10$^{-4}$ | −0.3509827 × 10$^{-8}$ | −0.1522329 × 10$^{-10}$ | −0.7904167 × 10$^{-12}$ |

Condition (1) value: $B_f/f = 0.9215$
Condition (2) value: $f_{1-2G}/f = 1.3992$
Condition (3) value: $f_{3G}/f = 1.5742$
Condition (4) value: $f_6/f = 3.3195$
Condition (5) value: $N_2 = 1.83481$
Condition (6) value: $N_3 = 1.84666$
Condition (7) value: $\upsilon_{d3} = 23.8$
Condition (8) value: $d_{5-6}/f = 0.15757$ Thus, Embodiment 1 satisfies each of Conditions (1)–(8).

Embodiment 2

The wide-angle lens of Embodiment 2 has the same basic lens construction as that of Embodiment 1.

Table 2 below lists the surface number #, in order from the object side, the radius of curvature R (in mm) of each lens element surface, the on-axis surface spacing D (in mm), as well as the index of refraction $N_d$ and the Abbe number $v_d$ (relative to the d line) for each lens element of Embodiment 2. The surface listed with a * to the right of the surface number # (surface #12) is an aspherical surface having a shape defined by Equation (A) above.

The values of the focal length f, the half-field angle ω, and the $F_{NO}$, as well as the constants K, $A_4$, $A_6$, $A_8$ and $A_{10}$ which define the aspherical surface according to Equation (A) above, are given in the middle portion of Table 2. In the lower portion of the table, the values of Conditions (1) to (8) are listed.

TABLE 2

| # | R | D | $N_d$ | $v_d$ |
|---|---|---|---|---|
| 1 | 3.0451 | 0.09854 | 1.77250 | 49.6 |
| 2 | 0.6894 | 0.58741 | | |
| 3 | 1.1719 | 0.28196 | 1.83481 | 42.7 |
| 4 | −2.2171 | 0.14077 | | |
| 5 | ∞ (stop) | 0.42231 | | |
| 6 | −0.6325 | 0.08446 | 1.84666 | 23.8 |
| 7 | 2.6782 | 0.01817 | | |
| 8 | 18.4904 | 0.22391 | 1.77250 | 49.6 |
| 9 | −0.9993 | 0.02815 | | |
| 10 | −9.4929 | 0.26319 | 1.71300 | 53.9 |
| 11 | −1.1394 | 0.15937 | | |
| 12* | 1.6356 | 0.26519 | 1.49018 | 57.8 |
| 13 | ∞ | 0.10000 | | |
| 14 | ∞ | 0.42347 | 1.51633 | 64.2 |
| 15 | ∞ | 0.53757 | | |

$f = 1.0 \quad \omega = 31.3 \quad F_{NO} = 2.2$
Aspherical coefficients of surface #12:

| K | $A_4$ | $A_6$ | $A_8$ | $A_{10}$ |
|---|---|---|---|---|
| −1.9913748 | −0.5523954 × 10$^{-4}$ | −0.4624334 × 10$^{-8}$ | −0.1713620 × 10$^{-10}$ | −0.8918810 × 10$^{-12}$ |

Condition (1) value: $B_f/f = 0.9165$
Condition (2) value: $f_{1-2G}/f = 1.3121$
Condition (3) value: $f_{3G}/f = 1.7046$
Condition (4) value: $f_6/f = 3.3232$
Condition (5) value: $N_2 = 1.83481$
Condition (6) value: $N_3 = 1.84666$
Condition (7) value: $\upsilon_{d3} = 23.8$
Condition (8) value: $d_{5-6}/f = 0.15937$ Thus, Embodiment 2 satisfies each of Conditions (1)–(8).

Embodiment 3

The basic lens element construction of Embodiment 3 is similar to that of Embodiment 1. However, in this embodiment the fourth lens element $L_4$ is a plano-convex lens, the fifth lens element $L_5$ is biconvex, and the sixth lens element $L_6$ is biconvex.

Table 3 below lists the surface number #, in order from the object side, the radius of curvature R (in mm) of each lens element surface, the on-axis surface spacing D (in mm), as well as the index of refraction $N_d$ and the Abbe number $v_d$ (relative to the d line) for each lens element of Embodiment 3. The surface listed with a * to the right of the surface number # (surface #12) is an aspherical surface having a shape defined by Equation (A) above.

The values of the focal length f, the half-field angle ω, and the $F_{NO}$, as well as the constants K, $A_4$, $A_6$, $A_8$, and $A_{10}$ which define the aspherical surface according to Equation (A) above, are given in the middle portion of Table 3. In the lower portion of the table, the values of Conditions (1) to (8) are listed.

In FIGS. 2A, 3A, and 4A, the spherical aberration is shown for incident light at wavelengths 546.1 nm, 460.0 nm and 615.0 nm. In FIGS. 2B, 3B, and 4B the astigmatism is shown in both the sagittal S and the tangential T planes. In FIGS. 2D, 3D, and 4D the lateral color is shown for incident light at wavelengths 460.0 nm and 615.0 nm Thus, by satisfying the above Conditions (1)–(8), a well-corrected image can be provided, and the space for focusing can be established within appropriate parameters, thus enabling the focusing operation to be smooth and the wide-angle lens itself to be desirably compact. By making the lens element used for focusing ($L_6$) from plastic, the aspherical surface thereon can be formed at low-cost, and the focus drive mechanism can be desirably light with a rapid response time.

The invention being thus described, it will be obvious that the same may be varied in many ways. For example, the radii of curvature R and surface spacings D may be readily scaled to achieve a wide-angle lens of an appropriate focal length, depending on the application. Such variations are not to be regarded as a departure from the spirit and scope of the

TABLE 3

| # | R | D | $N_d$ | $v_d$ |
|---|---|---|---|---|
| 1 | 2.1056 | 0.09881 | 1.77250 | 49.6 |
| 2 | 0.6575 | 0.73110 | | |
| 3 | 1.4342 | 0.28021 | 1.83481 | 42.7 |
| 4 | −1.9158 | 0.14116 | | |
| 5 | ∞ (stop) | 0.42347 | | |
| 6 | −0.7823 | 0.08469 | 1.84666 | 23.8 |
| 7 | 2.3156 | 0.03064 | | |
| 8 | ∞ | 0.25579 | 1.77250 | 49.6 |
| 9 | −1.1350 | 0.02823 | | |
| 10 | 28.7723 | 0.31221 | 1.71300 | 53.9 |
| 11 | −1.3856 | 0.19374 | | |
| 12* | 1.9088 | 0.27518 | 1.49018 | 57.8 |
| 13 | −220.2414 | 0.10000 | | |
| 14 | ∞ | 0.42347 | 1.51633 | 64.2 |
| 15 | ∞ | 0.52680 | | | f = 1.0   ω = 31.6   $F_{NO}$ = 2.2
Aspherical coefficients of surface #12:

| K | $A_4$ | $A_6$ | $A_8$ | $A_{10}$ |
|---|---|---|---|---|
| −1.5851025 | −0.5497821 × 10$^{−4}$ | −0.1824476 × 10$^{−8}$ | −0.3441003 × 10$^{−12}$ | −0.1582309 × 10$^{−13}$ |

Condition (1) value: $B_F/f$ = 0.9057
Condition (2) value: $f_{1-2G}/f$ = 1.2563
Condition (3) value: $f_{3G}/f$ = 1.8338
Condition (4) value: $f_6/f$ = 3.8465
Condition (5) value: $N_2$ = 1.83481
Condition (6) value: $N_3$ = 1.84666
Condition (7) value: $v_{d3}$ = 23.8
Condition (8) value: $d_{56}/f$ = 0.19374

Thus, Embodiment 3 satisfies each of Conditions (1)–(8).

FIGS. 2A–2D show the spherical aberration, astigmatism, distortion, and lateral color respectively, of the wide-angle lens of Embodiment 1, FIGS. 3A–3D show the spherical aberration, astigmatism, distortion, and lateral color respectively, of the wide-angle lens of Embodiment 2 and FIGS. 4A–4D show the spherical aberration, astigmatism, distortion, and lateral color respectively, of the wide-angle lens of Embodiment 3.

Furthermore, in each of these drawings, as well as in FIG. 1, ω is the half-field angle. As is clear from FIGS. 2A–4D, according to each Embodiment, improvements can be made in each aberration, and in particular for the chromatic aberration and distortion.

invention. Rather the scope of the invention shall be defined as set forth in the following claims and their legal equivalents. All such modifications as would be obvious to one skilled in the art are intended to be included within the scope of the following claims.

What is claimed is:

1. A wide-angle lens consisting of three lens groups having no more than 6 refractive lens elements, as follows, in order from the object side:

a first lens group which has negative refractive power and consists of a meniscus lens element with its convex surface on the object side;

a second lens group which has positive refractive power and consists of biconvex lens element;

a third lens group which has positive refractive power and consists of four lens elements having refractive power, said third lens group being formed of, in order from the object side, a biconcave third lens element, a positive fourth lens element having a convex surface on the image side, a positive fifth lens element having a convex surface on the image side, and a positive sixth lens element having a convex surface on the object side; and a diaphragm that is arranged between the second lens group and the third lens group.

2. The wide-angle lens of claim 1, wherein the following condition is satisfied:

$$0.8 < B_f/f < 1.1$$

where $B_f$ is the back focus of the whole system when focused on an object at infinity, and f is the focal length of the whole system.

3. The wide-angle lens of claim 1, wherein the following condition is satisfied:

$$1.1 < f_{1\text{-}2G}/f < 1.5$$

where $f_{1\text{-}2G}$ is the composite focal length of the first lens group and the second lens group, and f is the focal length of the whole system.

4. The wide-angle lens of claim 1, wherein the following condition is satisfied:

$$1.4 < f_{3G}/f < 2.1$$

where $f_{3G}$ is the focal length of the third lens group, and f is the focal length of the whole system.

5. The wide-angle lens of claim 1, wherein the following condition is satisfied:

$$3.0 < f_6/f < 4.5$$

where $f_6$ is the focal length of the sixth lens element and f is the focal length of the whole system.

6. The wide-angle lens of claim 1, wherein the following condition is satisfied:

$$N_2 > 1.72$$

where $N_2$ is the index of refraction, at the sodium d line, of the second lens element.

7. The wide-angle lens of claim 1, wherein the following condition is satisfied:

$$N_3 > 1.77$$

where $N_3$ is the index of refraction, at the sodium d line, of the third lens element.

8. The wide-angle lens of claim 1, wherein the following condition is satisfied:

$$\nu_{d3} < 30$$

where $\nu_{d3}$ is the Abbe number, at the sodium d line, of the third lens element.

9. The wide-angle lens of claim 1 wherein, at the time of adjusting the focus, only the sixth lens element is moved along the optical axis, and the following condition is satisfied.

$$0.15 < d_{5\text{-}6}/f < 0.35$$

where $d_{5\text{-}6}$ is the on-axis spacing between the fifth lens element and the sixth lens element, when focusing on an object at infinity, and f is the focal length of the whole system.

10. The wide-angle lens of claim 1, wherein the sixth lens element is formed of plastic.

11. The wide-angle lens of claim 2, wherein the sixth lens element is formed of plastic.

* * * * *

UNITED STATES PATENT AND TRADEMARK OFFICE
CERTIFICATE OF CORRECTION

PATENT NO. : 6,353,509 B1
DATED : March 5, 2000
INVENTOR(S) : Nakazawa

It is certified that error appears in the above-identified patent and that said Letters Patent is hereby corrected as shown below:

Column 2,
Line 59, change the equation to read as follows:

-- $0.15 < d_{5-6} / f < 0.35$     Condition (8) --;

Column 4,
Line 44, change "C (=1R)" to -- C (=1/R) --; and
Line 51, change "angle 106)" to -- angle $\omega$ --.

Signed and Sealed this

Third Day of September, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO.    : 6,353,509 B1
DATED         : March 5, 2002
INVENTOR(S)   : Nakazawa It is certified that error appears in the above-identified patent and that said Letters Patent is hereby corrected as shown below:

Column 2,
Line 59, change the equation to read as follows:

-- $0.15 < d_{5-6} / f < 0.35$    Condition (8) --;

Column 4,
Line 44, change "C (=1R)" to -- C (=1/R) --; and
Line 51, change "angle 106)" to -- angle $\omega$ --.

This certificate supersedes Certificate of Correction issued September 3, 2002.

Signed and Sealed this

Fifth Day of November, 2002

Attest:

JAMES E. ROGAN
Attesting Officer    Director of the United States Patent and Trademark Office